Feb. 17, 1970 P. W. WARD 3,495,460
FULL PULSE RESTORING FORCE GENERATION FOR GRAVITY METER CONTROL
Filed Sept. 26, 1966 2 Sheets-Sheet 1

INVENTOR
PHILIP W. WARD
ATTORNEY

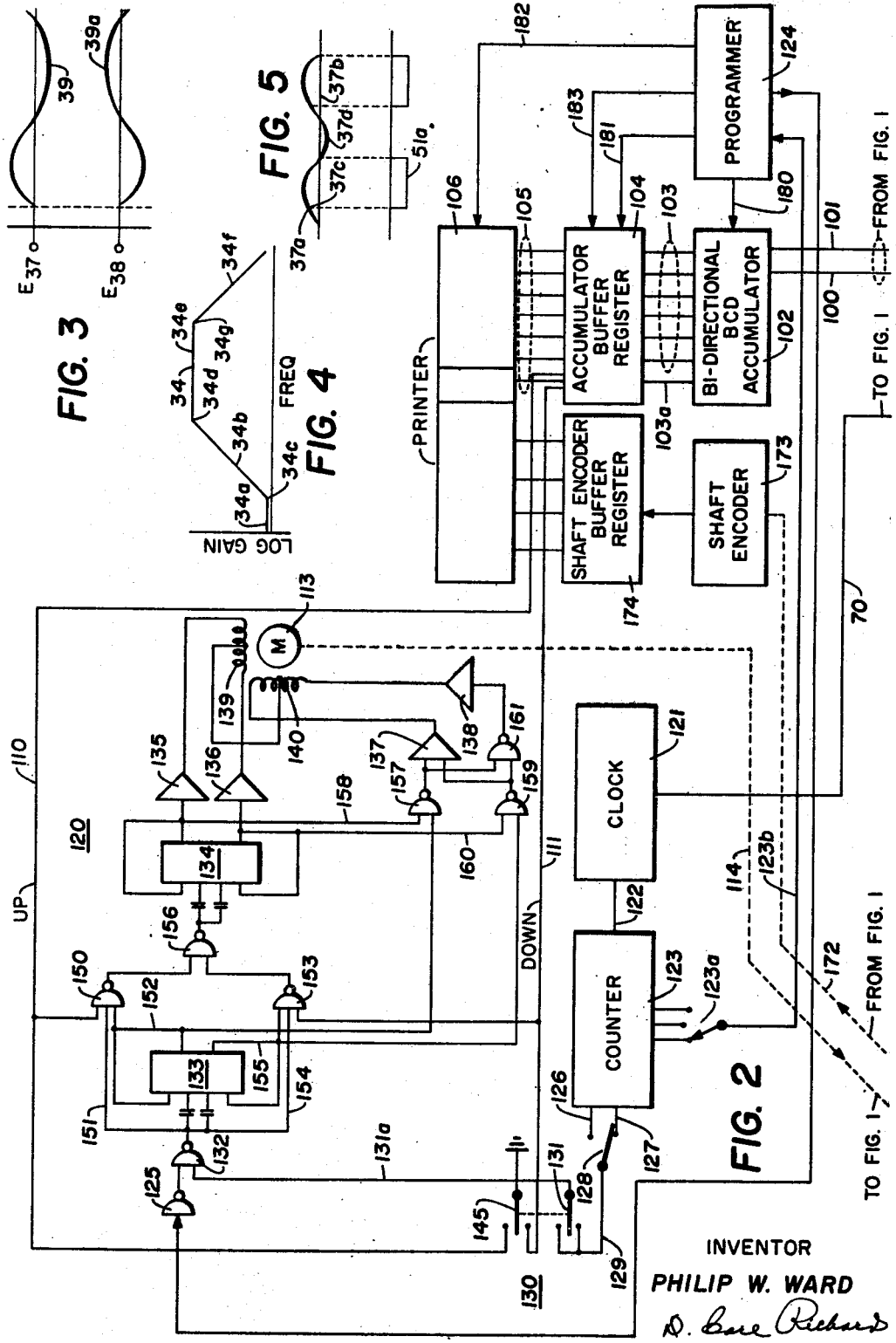

United States Patent Office 3,495,460
Patented Feb. 17, 1970

1

3,495,460
FULL PULSE RESTORING FORCE GENERATION FOR GRAVITY METER CONTROL
Philip W. Ward, Dallas, Tex., assignor to Texas Instruments Incorporated, Dallas, Tex., a corporation of Delaware
Filed Sept. 26, 1966, Ser. No. 581,787
Int. Cl. G01m 1/12
U.S. Cl. 73—382                                         6 Claims

ABSTRACT OF THE DISCLOSURE

An airborne gravity meter including an elastic force responsive system wherein means are provided for sensing imbalance thereof and for applying counteracting forces thereto to restore balance. A bridge network produces a deflection signal proportional to the imbalance of the elastic force responsive system. An amplifier having several stages of amplification receives the deflection signal as one input and the derivative of the deflection signal as a second input. One amplification stage of this amplifier includes circuitry to tailor the frequency response characteristic thereof to the frequency response characteristic of the elastic force responsive system. Logic synchronizer circuitry responds to the output of the amplifier and generates restoring force pulses of one sense or the other depending on the sense of the imbalance signal for producing the counteracting forces acting on the elastic force responsive system to restore balance thereto. The logic circuitry includes means for normally inhibiting both of the restoring force pulses below a predetermined level of deflection signal.

---

This invention relates to an airborne gravity meter and more particularly to the provision for assuring generation of pulses of force on sensitive elements in an elastic gravity meter suspension which may reliably be represented by an indication of the number of such pulses.

The invention is directed to an improvement in a gravity meter of the type described in Worden Patent No. 3,211,003. The present invention provides for operation of such a gravity meter wherein the algebraic sums of upward and downward force pulses produced in successive measuring intervals will accurately portray variations in gravity along a line over which the meter passes.

More particularly in accordance with the invention, a control channel is provided for an elastic force responsive system wherein means are provided for sensing imbalance thereof and for applying counteracting forces thereto to restore balance. A signal channel is connected to the sensing means to produce an output signal representative of the sense and magnitude of imbalance. Means are provided for producing force pulses for restoring balance which in number are dependent upon magnitude and direction of the imbalance.

A synchronizing system is provided which will make certain that uniform force pulses are employed and that the use of the pulses will not result in any ambiguity in indicating the gravity variations through the algebraic sum of up and down pulses.

In accordance with the present invention, pulsed forces are applied to restore the position of the sensitive element in a gravity meter wherein an indication is provided as to the sum of up and down pulses generated during a given measuring interval which corresponds precisely

2 with the algebraic sum of the number of full pulses applied to the instrument and wherein generation of pulses is inhibited for all signals below a threshold level in which noise is primarily involved.

For a more complete understanding of the present invention and for further objects and advantages thereof, reference may now be had to the following description taken in conjunction with the accompanying drawings in which:

FIGURE 2 illustrates the rest of the gravity meter system and is to be taken with FIGURE 1;

FIGURE 3 illustrates imbalance waveforms produced in the circuit of FIGURE 1;

FIGURE 4 illustrates the frequency response characteristic of the circuit of FIGURE 1; and FIGURE 5 illustrates the operation of the synchronizer of FIGURE 1.

Figure 1:
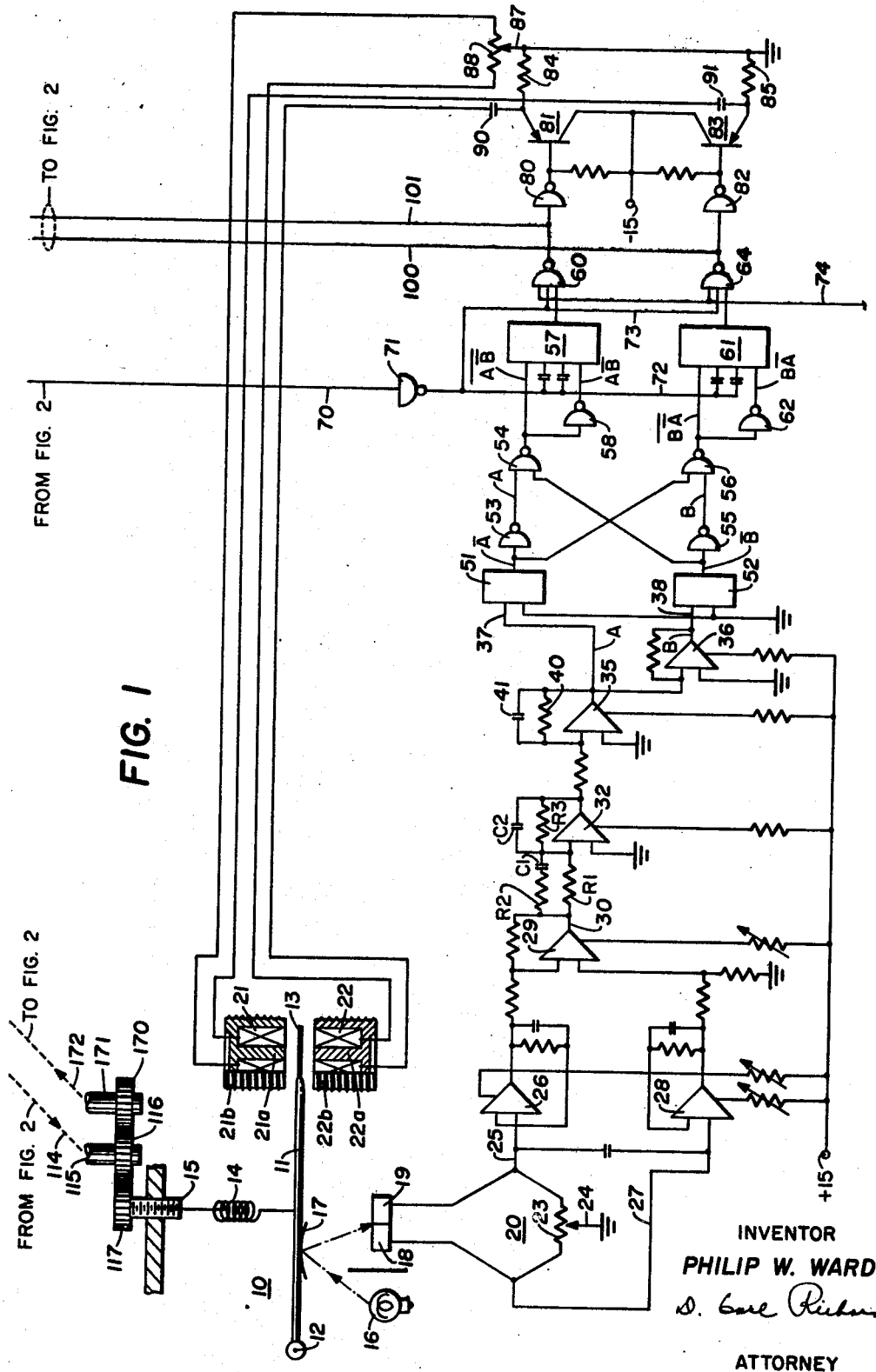
FIGURE 1 is a schematic diagram of a portion of an airborne gravity meter embodying the present invention.

In FIGURE 1, a system has been illustrated wherein a gravity meter 10 is shown in diagrammatic form. The gravity meter may be of the type described in Worden Patent No. 2,674,887 and as further described in Worden Patent No. 3,211,003. In FIGURE 1, as in the latter patent, the elastic balance system has an arm 11 which is resiliently pivoted for rotation about a horizontal pivot axis 12. The arm 11 includes a metallic conductive ring 13 at the end thereof opposite the pivot 12. A spring 14 provides for support of the arm 11 and is coupled to an adjusting screw 15. By rotation of screw 15, the position of the ring 13 may be controlled.

It will be understood that the gravity meter 10, when mounted in an aircraft, will be supported on a stable platform which is controlled such that the pivot axis 12 will be maintained horizontal. Thus mounted, the meter 10 will be subject to vertical accelerations which will change the position of the arm 11. Further, the gravity meter may be subject to variations in gravitational pull which will cause the position of the arm 11 to change.

It is desired to be able to measure the gravitational changes while operating the gravity meter in an environment wherein it is subject to acceleration forces such as on an aircraft. As noted in Worden Patent No. 3,211,003, the acceleration forces may be of the order of 50,000 times as great as the desired resolution of the gravitational forces.

In order to achieve measurement of the relatively insignificant changes in the force gravity in the presence of large acceleration forces, it has been found to be essential that control described herein be provided.

The position of the arm 13 is sensed by detecting variations in the position of a beam of light emanating from a source 16, reflected from mirror 17 on arm 11 and impinging on photocells 18 and 19. When the arm 11 is at a preferred horizontal balance position, the light beam falls on cells 18 and 19 equally so that the output signals therefrom are equal.

The cells 18 and 19 form two adjacent arms of a bridge network 20. Balance of the bridge is to be maintained through a feedback loop which includes the suspension in meter 10. Unbalance signals in the bridge 20 are employed to control restoration pulses to either coil 21 or 22, depending upon the direction of deflection of arm 11.

The bridge 20 has third and fourth arms formed by a center taped potentiometer 23. The variable tap 24 is connected to ground. One extremity of potentiometer 23 is connected by way of conductor 25 to an amplifier 26. The other extremity of potentiometer 23 is connected by way of conductor 27 to an amplifier 28. Circuit arrangements for use of such amplifiers in push-pull relation are well known and may be generally as illustrated in FIGURE 1.

The push-pull output signals from amplifiers 26 and 28 are applied to the input terminals of an amplifier 29 which converts the push-pull input to a single-ended output. The latter signal appears on output channel 30. The signal on channel 30 thus represents the displacement of the seismic mass or arm 11.

The displacement signal is applied by way of a coupling resistor $R_1$ to the input of an amplifier 32. A second component of the displacement signal is applied to the input of amplifier 32 by way of derivative circuit $R_2C_2$. The amplifier has a feedback circuit $R_3C_2$. Thus, a signal is applied to amplifier 32 which is proportional to displacement and to the first derivative of displacement. The use of the derivative or velocity component of movement of arm 11 renders the control of the position of the arm more effective than otherwise would be possible.

In FIGURE 3 the character of the signals on lines 37 and 38 has been illustrated wherein amplitude has been plotted as a function of time. The signal represented by waveform 39 represents the quantity $(x+kdx/dt)$ where $x$ represents the displacement of arm 11. The waveform 39a represents the signal $-(x+kdx/dt)$.

Signals such as shown in FIGURE 3 preferably are produced so as to be of optimum character by suitably controlling the response of amplifier 32. Preferably, such response closely matches the frequency response character of the meter 10.

The response of amplifier 32 is of the nature illustrated in FIGURE 4. The curve 34 of FIGURE 4 is represented by linear segments. It will be understood, however, that there will be some curvature involved at the asymptotes.

The first segment 34a of curve 34 represents a gain which is dependent primarily upon the ratio $R_3/R_1$. The segment 34b has a slope of 6 db per octave with asymptote 34c at a frequency equal to $f_1=\frac{1}{2}\pi R_1C_1$. The gain represented by segment 34e is proportional to the ratio $R_3/R_2$. Ultimately, at a higher frequency the gain decreases, in accordance with segment 34f, with asymptote 34g being at a frequency $f_3=\frac{1}{2}\pi R_3C_2$.

Preferably, the values of $R_1$, $R_2$, $R_3$, $C_1$, and $C_2$ are chosen such that the response matches the frequency response characteristic of the meter 10. This characteristic will vary from unit to unit in which case suitable adjustments are made in the circuit parameters for amplifier 32.

The signal from amplifier 32 is then applied to amplifiers 35 and 36. The signal appearing on output conductor 37 represents the imbalance signal. The inverter 36 provides the same signal on line 38 but inverted in polarity.

It will be noted that each of the amplifiers 29, 32, 35 and 36 have a resistive feedback loop. In each of the amplifiers 26, 28, 32 and 35 a feedback capacitor is connected in parallel with the feedback resistor. For example, amplifier 35 has a feedback resistor 40 and a parallel feedback capacitor 41. The capacitors improve the high frequency stability.

The signals appearing between conductor 37 and ground and between conductor 38 and ground are applied to the input of a synchronizer. The synchronizer is provided, in accordance with the present invention, in order to avoid ambiguities present in operation of prior systems. The synchronizer includes a pair of Schmitt triggers 51 and 52 at the input thereof. The signal on channel 37 is applied to trigger 51. The signal on channel 38 is applied to trigger 52. The signal state on line 37 may be identified as A and will be present so long as the arm 11 is deflected upward. The signal on line 38 will be identified as B and will be present so long as the arm 11 is deflected downward. In operation of the system, restoring force pulses are applied to coil 21 or to coil 22. Application of a pulse to both coils at the same time is not permitted. The system operates to produce unbalance signals in bridge 20 which at some threshold emerge above the noise level. The triggers 51 and 52 are suitably biased at the input so that restoring pulse forces are generated only when it is certain that a signal component is present on line 37 or line 38 which is due to unbalance of the gravity meter and is above the noise level.

More particularly, in FIGURE 5, the waveform 37a may be taken as representative of the signal appearing on line 37. If the line 37b represents the zero voltage level, the signal 37c may then be taken to represent the bias on trigger 51 which prevents the trigger 51 from changing states until the voltage on line 37 reaches a predetermined level. At that point the trigger 51 will change state as represented by the square wave 51a to open a gate which permits generation of restoring force pulses as will be described. The trigger 52 is similarly biased so that it will not respond to the relatively low voltage excursion 37d but rather requires a greater unbalance signal before restoring force pulses will be produced to move the loop 13 downward.

At the outputs of triggers 51 and 52, the states will be "not A" ($\overline{A}$) and "not B" ($\overline{B}$), respectively. The state $\overline{A}$ is applied to an inverter 53 so that the state A is applied to one input of nand gate 54. The state $\overline{A}$ is also applied to one input of second nand gate 56. The state $\overline{B}$ is applied to an inverter 55 so that state B is applied to the second input of the nand gate 56. The state $\overline{B}$ is also applied to the second input of nand gate 54. The output of nand gate 54, i.e. $\overline{A\overline{B}}$ is applied to one input gate of a flip-flop 57 and, by way of an inverter 58, to $A\overline{B}$ the complement input gate of flip-flop 57. These logic levels are clocked into the flip-flop 57 synchronously by clock line 72. The output of unit 57 is connected to one input of a nand gate 60.

Similarly, the output of nand gate 56 is connected to one input gate of a second flip-flop 61 and, by way of an inverter 62 to a second input gate of unit 61. Unit 61 is connected at its output to one input of a nand gate 64.

Clock pulses supplied by way of line 70 and an inverter 71 are capacitively coupled to input terminals on each of flip-flops 57 and 61 by way of conductor 72. The clock pulses are also connected to a second input terminal on each of the nand gates 60 and 64 by way of conductor 73. In this manner, full clock pulses are synchronously applied to gates 60 and 64 as a function of the position of the mass arm 13, i.e. no pulses are applied for positions near null and full correcting pulses are applied to one gate or the other if the arm is displaced. The synchronizer eliminates the ambiguity present in the Schmitt trigger output which is necessary to accommodate a finite noise level.

Conductor 74 is provided for manually applying an inhibit state to both of the nand gates 60 and 64.

The output of the nand gate 60 is applied by way of an inverter 80 to the base of an amplifier transistor 81. Similarly, the output of nand gate 82 is applied to the base of an amplifier transistor 83. The output of transistor 81 appears across resistor 84. The output of transistor 83 appears across resistor 85. The juncture between resistors 84 and 85 is connected to ground and to a variable tap 87 on a potentiometer 88. The juncture between resistor 84 and the emitter of transistor 81 is connected by way of the condenser 90 to one terminal of the up coil 22. The juncture between resistor 85 and the emitter of transistor 83 is connected by way of condenser 91 to the upper terminal of the down coil 21. The extremities of potentiometer 88 are connected to the other terminals of coils 21 and 22, respectively. Condensers 90 and 91 serve to tune the circuits which include coils 21 and 22 for efficient transfer of energy to the ring 13.

In one embodiment, the coils were of construction indicated in FIGURE 1 wherein coil 21 is wound on a bobbin as to encompass the center leg 21a of a cup-shaped core 21b. The core 21b was of type KD–2C manufactured and sold by Fair-Rite Products Corporation, Wallkill, N.Y. The core has an outside diameter of 0.375 inch and a length of 0.210 inch. Each coil comprised 1300 turns of No. 46 copper wire. The coils were employed with condensers 90 and 91 of 0.047 micro-farad. Ring 13 was made of aluminum with 0.30 inch outside diameter and with a ring width of from 0.040 inch to 0.080 inch and a thickness of from 0.008 to 0.020 inch. Confronting surfaces of the cores 21b and 22b were spaced apart a distance of from 0.08 inch to 0.12 inch.

With such a system, balance of the arm carrying ring 13 was maintained within the limits determined by the coil spacing. The synchronizer makes certain that the coils will be excited by full pulses and that there will be a pulse applied only to coil 21 or to coil 22 and never to both coils 21 and 22 at the same time. As above described, the Schmitt triggers 51 and 52 are operated with a selected threshold level such that no pulse will be applied to coil 21 or 22 until the signal from bridge 20 exceeds the preset level which is certain to be due to an unbalance.

Referring now to FIGURE 2 and particularly to lines 100 and 101 which lead from gates 60 and 64 of FIGURE 1, pulses are applied by way of lines 100 and 101 to a bidirectional binary coded decimal accumulator 102.

The accumulator contains six decades, a sign bit and an overflow indicator. The accumulator 102 functions to accumulate the algebraic sum of pulses required to maintain the arm 11 of the gravity sensor at null. The accumulator operates bidirectionally. It adds all pulses which are applied to the down coil 21 of the gravity sensor and subtracts all pulses which are applied to the up coil 22. The least significant decades are subject to rapid up-down variations even under conditions of zero acceleration unless the tension of the spring 14 happens to be adjusted to a perfect null position. Thus the accumulator 102 acts as an averaging register, providing the absolute algebraic value of the accumulated pulses and a sign bit to indicate in which direction the greater number of pulses have been applied. The accumulator 102 is coupled by channels 103 to an accumulator buffer register 104. All of the channels 103 transfer numerical information except for the last channel 103a which transfers the sign bit indication.

The register 104 is then coupled by way of channels 105 to a printer 106 which prints the contents of the register 104 for each averaging interval. The printed information includes both the digits representing the number of pulses and the sign.

Lines 110 and 111 lead from the accumulator 104 and transmit the sign bit on line 110 and its complement on line 111. The sign bit state and complement, together with a pulse from a clock 121, transmitted by way of counter 123, control energization of a stepping motor 113 which is coupled by linkage 114 to shaft 115, FIGURE 1. Shaft 115 is coupled by way of gear 116 to a gear 117 on screw 15. By rotation of shaft 115, the tension on spring 14 is either increased or decreased as may be necessary in order to maintain the arm 11 at a near balance position.

Thus while the accumulator 102 provides information which is printed by printer 106 for each averaging interval, the stepping motor control circuit 120 provides for energization of motor 113 for each averaging interval in direction dependent upon the sign of the contents in register 104.

Clock 121, which provides clock pulses on line 70 which leads to the circuit of FIGURE 1, also provides an output on line 122 which supplies a counter 123. The output of counter 123 also is coupled to a programmer 124 and to an inverter 125 at the input of a stepper motor driver circuit 120. The counter 123 provides two lines, 126 and 127, which lead to a switch 128. Pulses at different rates are applied to lines 126 and 127. One pulse per second may appear on line 126 and ten pulses per second may appear on line 127, for example. Such pulses are available at switch 128. Switch 128 is connected by way of line 129 to two terminals of a center biased double-pole double-throw switch 130. Arm 131 serves to apply pulses, upon manual actuation, to one terminal of a nand gate 132 by way of conductor 131a. The output of inverter 125 is coupled to the second input of gate 132.

The driver circuit 120 is composed of a two-stage bi-directional counter and comprises a first flip-flop 133 and a second flip-flop 134. Phase selection logic elements serve to interconnect the counter elements and four solenoid drivers 135, 136, 137 and 138. The solenoid drivers are logic power boosters which drive the windings 139 and 140 of the two-phase stepper motor 113. The circuit operates such that two of the solenoid drivers 135–138 are on at the same time. However, the transition between drivers, when stepping the motor 113, affects only one driver at a time. By this means, the output is phase-shifted. The sequence of the output determines the direction of rotation of the motor 113. The system as illustrated serves to step motor 113 at the end of every measuring interval, one step at a time.

The phase selection logic elements in the circuit 120 are used to produce an output which is phase-shifted one bit with respect to flip-flop 134. When the driver circuit 120 is sequenced with a constant repetition rate input as is the case when switch 131 is actuated, the output waveform across the two windings of the motor 113 are two-phase square waves. A switch 145 coupled to switch 131 serves selectively to apply a ground state to either the up line 110 or the down line 111.

The control logic in circuit 120 includes a nand gate 150, has line 110 connected to one input thereof, line 151 leading from the output of gate 132 to the second input thereof, and line 152 leading from the output of flip-flop 133 to the third input thereof. A second nand gate 153 has line 111 connected to one input thereof, the output of gate 132 connected to the second input thereof by way of line 154, and the complement of the output from flip-flop 133 applied to the third input thereof by way of line 155.

The outputs of gates 150 and 153 are connected to the inputs of a nand gate 156 whose output drives flip-flop 134. Line 152 is connected to one input of a nand gate 157, the other input of which is driven by the output of the flip-flop 134 by way of line 158. The complement, on line 155, is applied to one input of a nand gate 159, the second input of which is driven by the complement output of the flip-flop 134 by way of line 160. The outputs of gates 157 and 159 are applied to driver 137 and to a nand gate 161. The output of gate 161 is applied to driver 138. The output of flip-flop 134 is applied to driver 135. The complement output of flip-flop 134 is applied to driver 136.

The circuits thus described are provided for controlling the input gating and bidirectional counting of flip-flops 133 and 134. The reversible bidirectional counter in circuit 120 is controlled by the logic levels on lines 110 and 111. If the motor 113 is to respond to an increase in count, line 111 must be at ground level. Conversely, for the counter to increase, line 110 must be grounded. The control of the unit 120 must be synchronous with the input. That is, the levels on lines 110 and 111 must be asserted before the input level shifts from ground to a negative state. It is for this reason that manual control of the motor 113 is programmed under the clock control pulses applied by way of lines 126 and 127 and switches 128 and 130. Fast (10 steps per second) or slow (1 step per second) rates are thus manually selectable. The control switch 130 is spring-loaded with the central position off.

In FIGURE 1 it will be noted that shaft 115 is coupled by way of a gear train, including gear 116 and gear 170, to a shaft 171 which is coupled as indicated by linkage 172 to a shaft encoder 173. The position of the shaft 171 is thus stored digitally by a shaft encoder buffer register 174. Any suitable shaft encoder may be employed to supply the shaft encoder buffer register with digital location of shaft 171 from a reference position. The register 174 is coupled to the printer 106. The shaft encoder 173 thus provides shaft position information indicative of the spring tension in the gravity meter 10. In one embodiment the encoder provided four decades of BCD shaft position information.

Nulling operations can be conducted manually by adjusting the stepper motor 113 to null the position of the arm 11. Thereafter the motor 113 may be disabled and a flight may be conducted dependent solely upon the operation of the balance restoration system of FIGURE 1 with the results being printed on the portion of printer 106 responsive to register 104.

All commands are issued by the programmer after each averaging interval provided by the counter 123 is complete. The averaging interval is manually selected by setting counter 123 and switch 123a. Register 104 holds the contents of the previous averaging interval until the end of the next averaging interval. The programmer then resets register 104 by a suitable state on line 183. A transfer command transfers the contents of accumulator 102 to register 104 by a control state on line 181. This transfer takes place in the interval between a pair of clock pulses so that there will be avoided the introduction of any error that would be present if any correction pulse was actually present during the time the transfer was being made. The printer is actuated during the succeeding relatively long averaging interval to print the contents of register 104 by a control state on line 182. The accumulator 102 is then reset by the programmer by a suitable state on line 180. The entire transfer to the buffer register and reset of the accumulator 102 is timed by the programmer such that no pulse which might appear on lines 100 or 101 is ever present during this interval.

Amplifiers 26 and 28 may be of the type manufactured and sold by George A. Philbrick Researches, Inc., Dedham, Mass., and identified as operational amplifiers PP65AU.

In one embodiment, the accumulator was of the type manufactured and sold by Beckman Instruments Inc., Model 6015 and identified as a Dual Preset Reversing Accumulator.

The printer 106 was a unit manufactured and sold by Franklin Electronics, Inc., Bridgeport, Pa., Series 1200 Printer and was identified as a High Speed Digital Printer.

The sensor having a bridge and signal forming circuits as described herein are described and claimed in copending application Ser. No. 581,786, filed Sept. 26, 1966 for James D. Shaw, assigned to the assignee of the present invention.

Having described the invention in connection with certain specific embodiments thereof, it is to be understood that further modifications may now suggest themselves to those skilled in the art and it is intended to cover such modifications as fall within the scope of the appended claims.

What is claimed is:
1. A gravity meter including an elastic balance system having means for producing an unbalance signal and generating means for producing balance restoring force pulses in one of two senses, depending upon the sense of said unbalance signal, the combination which comprises:
 (a) a logic circuit having two inputs and two outputs,
 (b) means for applying said unbalance signal to one of said inputs and for applying the inverse of said unbalance signal to the other of said inputs,
 (c) means for applying clock pulses at a selected rate to both of said outputs,
 (d) means for connecting said outputs individually to said generating means,
 (e) means for normally inhibiting both of said outputs to prevent application of erroneous force pulses to said generating means resulting from noise pickup, and
 (f) means for enabling only full force pulses of one or the other of said outputs in response to one of said signal and said inverse of said signal only above a predetermined level.

2. A gravity meter including an elastic balance system having generating means for producing counteracting force pulses to restore balance in response to an unbalance signal produced by change within said system away from a null condition, the combination which comprises:
 (a) means for producing said unbalance signal and the inverse of said signal,
 (b) a logic network having two inputs to which said unbalance signal and its inverse respectively are applied for generating two output pulses,
 (c) means for eliminating erroneous control pulses by inhibiting both of said outputs from response to inputs below a predetermined level,
 (d) means for always inhibiting at least one of said outputs, and
 (e) means for applying high frequency pulses to said logic network for transmission to said generating means by way of one of said outputs controlled by said signal and the inverse thereof.

3. A gravity meter including an elastic force responsive system having sensing means responsive to force unbalance and a counteracting force applying means to be responsive to the force unbalance and arranged to apply forces instantaneously to the elastic balance system to counteract the sensed unbalance, the combination which comprises:
 (a) logic control means having two input channels and two output channels,
 (b) means for applying signals to said two input channels, respectively, representative of said unbalance and the inverse of said unbalance,
 (c) a first circuit having a predetermined threshold above a zero signal level interconnecting one of said input channels and one of said output channels,
 (d) a second circuit having a predetermined threshold above a zero signal level interconnecting the second of said input channels and the second of said output channels,
 (e) means for introducing pulses at a high repetition rate compared with the frequency of said signals into said first circuit and said second circuit, and
 (f) means for always inhibiting transmission of said high frequency pulses in at least one of said output channels.

4. In an elastic force responsive system having sensing means responsive to force imbalance and a counteracting force applying means responsive to the force imbalance and arranged to apply forces instantaneously to the elastic balance system to counteract the sensed imbalance, the combination which comprises:
 (a) a logic circuit having two outputs connected to said force applying means and two inputs,
 (b) means for applying signals to said two inputs, respectively, representative of said imbalance and the inverse of said imbalance,
 (c) a first circuit interconnecting one of said inputs and one of said outputs including in series a Schmitt trigger, an inverter, a nand element, a flip-flop and a nand element,
 (d) a second circuit interconnecting the second of said inputs and the second of said outputs corresponding with said first circuit, (e) means for applying the output of the Schmitt trigger of the first circuit to the first nand gate of the second circuit and for applying the output of the Schmitt trigger in the second circuit to the first nand gate in said first circuit, and (f) means for applying clock pulses to the second nand gates in both of said first and second circuits.

5. The combination set forth in claim 4 wherein said Schmitt triggers have thresholds at a predetermined level above the noise level of said sensing means.

6. The combination set forth in claim 4 wherein the outputs of the second nand elements in each of said first and second circuits are each connected directly to one flip-flop input and are nanded to the second input thereof.

References Cited

UNITED STATES PATENTS

| | | | |
|---|---|---|---|
| 2,136,219 | 11/1938 | Scherbatskoy | 73—382 |
| 3,286,245 | 11/1966 | Cozart | 73—518 |

RICHARD C. QUEISSER, Primary Examiner

JOHN R. FLANAGAN, Assistant Examiner